United States Patent [19]

Childre et al.

[11] Patent Number: 4,850,130

[45] Date of Patent: Jul. 25, 1989

[54] SLIDING FOREGRIP FOR A FISHING ROD

[75] Inventors: Casey J. Childre; George V. Walker; Michael Speh, all of Foley, Ala.

[73] Assignee: Lew Childre & Sons, Inc., Foley, Ala.

[21] Appl. No.: 230,600

[22] Filed: Aug. 10, 1988

[51] Int. Cl.⁴ .................... A01K 87/00; A01K 97/10
[52] U.S. Cl. ............................................. 43/23; 43/25
[58] Field of Search .................. 43/4, 4.5, 21.5, 22, 43/23, 25

[56] References Cited

U.S. PATENT DOCUMENTS

| | | | |
|---|---|---|---|
| 2,826,852 | 3/1958 | Wardrip | 43/23 |
| 4,453,332 | 6/1984 | Wightman | 43/23 |
| 4,559,735 | 12/1985 | Batick, Jr. | 43/21.2 |
| 4,648,196 | 3/1987 | Moody | 43/23 |
| 4,697,377 | 10/1987 | Martin | 43/23 |

Primary Examiner—Nicholas P. Godici
Assistant Examiner—Michael William Starkweather
Attorney, Agent, or Firm—Lockwood, Alex, Fitzgibbon & Cummings

[57] ABSTRACT

A fishing rod foregrip which is slidable on the fishing rod between a first fishing reel installation or removal position and a second fishing reel engagement position is provided. The foregrip is formed from a flexible and resilient material and includes a hollow elongate hood portion which, when the foregrip is in the reel engagement position, engages the fishing rod blank, the reel seat nut assembly, and a portion of the fishing rod handle. A reel stem portion angularly extends from the hood portion to engage a portion of the fishing reel foot and reel stem. The hood portion, on its upper outer surface, is provided with a generally planar portion to serve as a thumb engagement surface.

12 Claims, 2 Drawing Sheets

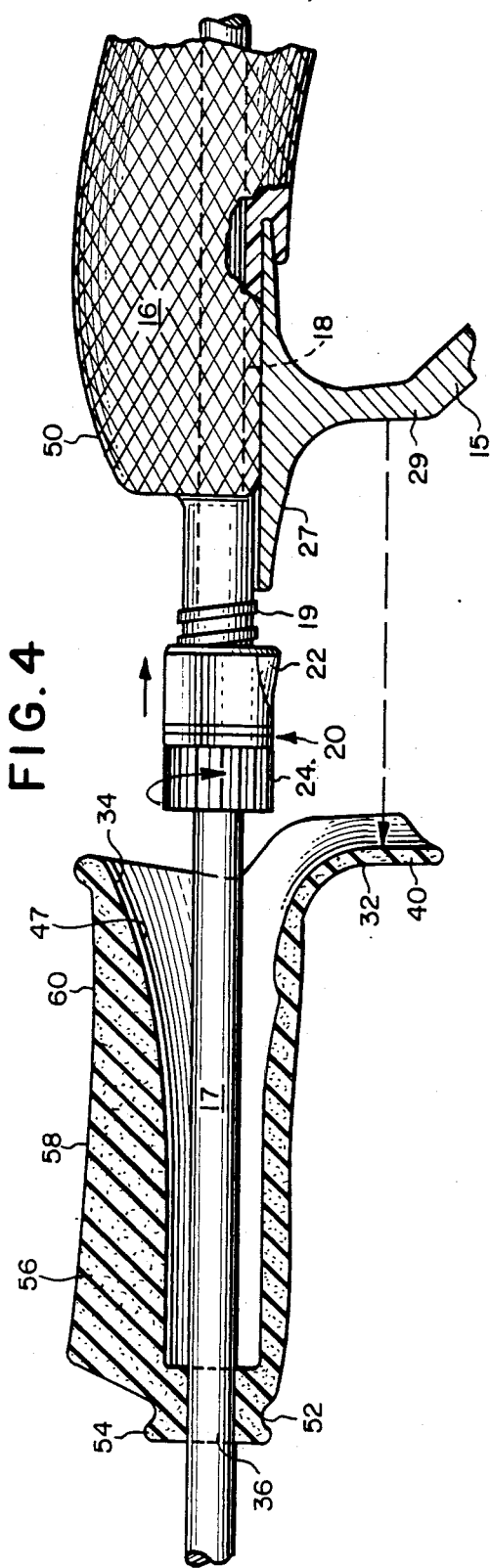
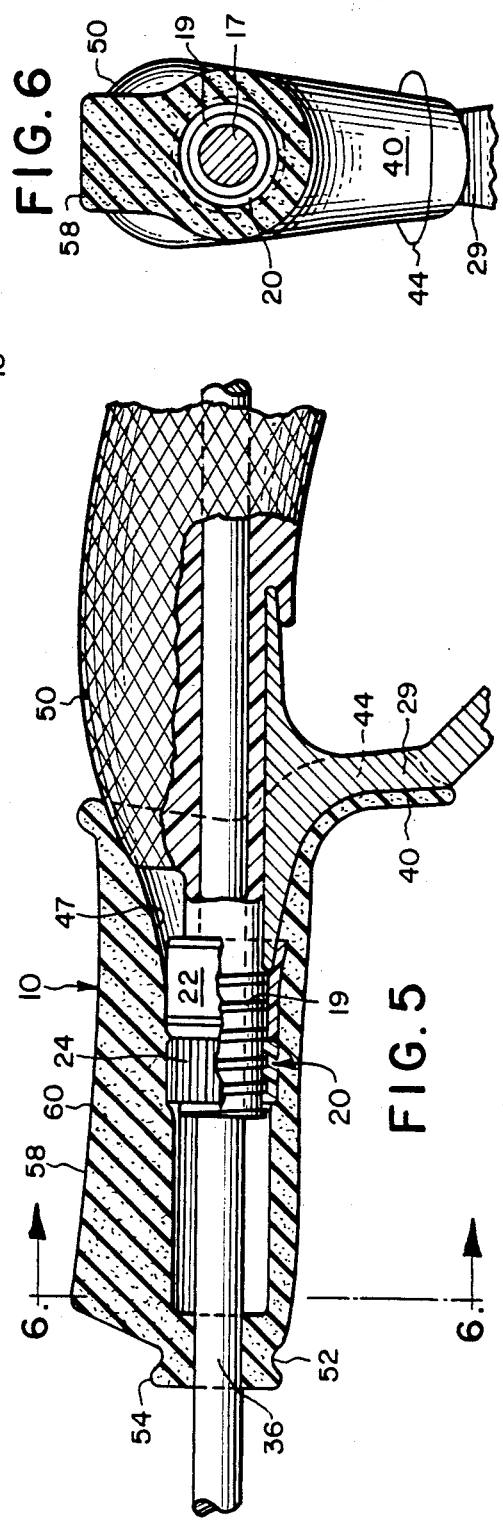

SLIDING FOREGRIP FOR A FISHING ROD

BACKGROUND AND SUMMARY OF THE INVENTION

The present invention relates generally to fishing rods and more particularly to fishing rod foregrips which cover a portion of the fishing reel seat and the fishing reel stem.

Fishing rods commonly utilize separate foregrips which are located just forward of the fishing rod's reel seat. These foregrips terminate immediately adjacent the reel seat securement device, and leave the reel seat nut and reel seat threads exposed to contact the fisherman's hand. With such foregrips the fisherman is subjected to the uncomfortable feel of the nut and thread. Additionally, movement of the hand can lead to loosening of the reel seat nut and consequently, the fishing reel. Moreover, as the foregrip does not typically cover the fishing reel foot and its stem, the fisherman's hand continually contacts the reel stem during casting and retrieving which can lead to fatigue.

The present invention is directed to a sliding foregrip which avoids the above shortcomings in which the foregrip is formed from a single piece of resilient material and covers a portion of the reel seat nut, the reel seat threads and the reel stem in the areas of hand contact. In a sliding foregrip incorporating the principles of the present invention, a resilient material is formed into a sliding foregrip having an elongate hood portion with a fishing rod opening extending therethrough, with the hood being dimensioned so as to cover the exposed reel seat nut and reel seat threads. A stem portion extends downwardly from the hood portion and is generally angled to engage the fishing reel stem when mounted on the fishing rod. The foregrip hood portion includes an inclined planar portion disposed forward of the stem portion to serve as a thumb engagement surface which is utilized primarily during casting as a push point for accuracy and power.

Accordingly, it is a general object of the present invention to provide an improved fishing rod foregrip which provides a cover for a portion of the reel seat and a portion of the reel stem.

It is another object of the present invention to provide a fishing rod foregrip which is slidable between a fishing reel removal or installation position and a fishing reel engagement position.

It is a further object of the present invention to provide a resilient foregrip which covers a portion of the fishing rod reel mounting hardware and a portion of the fishing reel which foregrip provides a hand engagement surface.

It is yet another object of the present invention to provide a fishing rod foregrip having a hood portion and a reel engagement portion angularly extending from the hood portion which is slidable on the fishing rod between a first reel installment or removal position and a second reel engagement position wherein the foregrip hood portion snugly engages the fishing reel nut and a reel foot and includes a generally planar thumb engagement surface thereon.

These and other objects, features and advantages of the present invention will be clearly understood through a consideration of the following detailed description.

BRIEF DESCRIPTION OF THE DRAWINGS

In the course of this description, reference will be made to the attached drawings in which:

FIG. 4 is an enlarged partially sectional elevational view of a sliding foregrip in a reel removal or installation position;

FIG. 5 is a enlarged partially sectional elevational view of a sliding foregrip installed on a fishing rod in a reel engagement position; and FIG. 6 is a sectional view of the foregrip of FIG. 5 taken along lines 6—6.

DETAILED DESCRIPTION OF THE INVENTION

Figure 1:
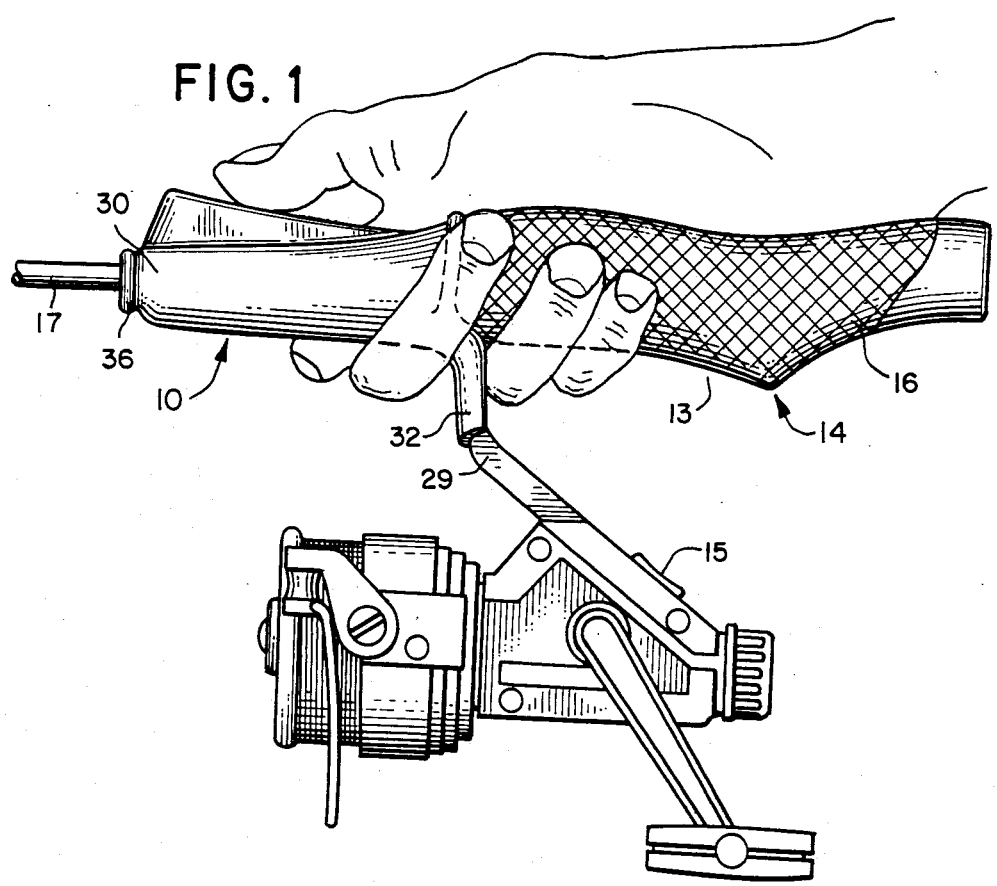
FIG. 1 is an elevational view of a sliding foregrip incorporating the principles of the present invention in place on a fishing rod in a reel engagement position.

Referring now to the drawings, FIG. 1 illustrates the environment in which the present invention is used. A sliding foregrip 10 constructed in accordance with the principles of the present invention is particularly suited for use on spinning rods in which the reel seat area 12 is located on the bottom face 13 of the fishing rod 14. Such spinning rods typically include a rod handle 16, a rod blank 17 extending forwardly from the rod handle 16, and a fishing reel mounting seat area 12 which includes a reel seat 18 for receiving a fishing reel 15 thereon, and a series of seat threads 19 which engage threaded reel nut assembly 20. The reel nut assembly 20 commonly includes a threaded reel seat nut 24 which threadedly engages the reel seat threads 19 and a reel foot engagement collar 22 which slides or the reel seat 18 in response to rotation of the reel seat nut 24. In use, the fishing reel 15 is mounted on the reel seat 18 such that its rear foot 26 engages a rod handle reel foot opening 28 and the reel nut assembly 20 is turned until the reel collar 22 snugly engages the fishing reel front foot 27. It will be understood that the above elements are common to spinning rods and therefore form no part of the present invention.

Figure 2:
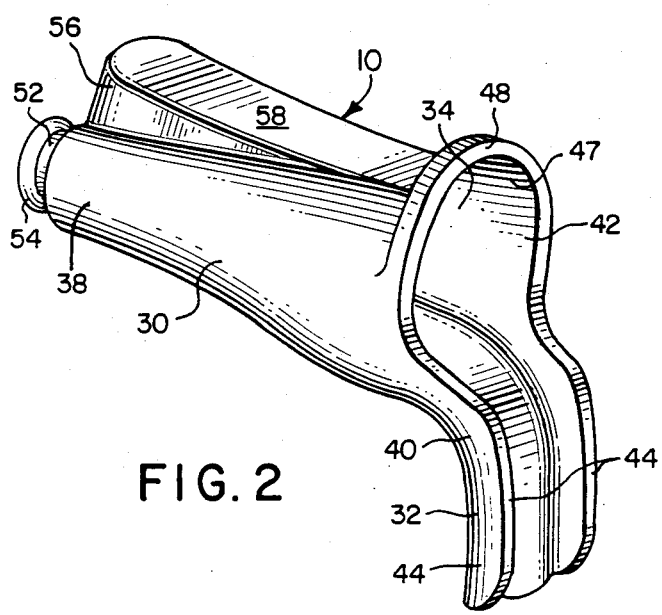
FIG. 2 is a perspective view of the sliding foregrip of FIG. 1.
Figure 3:
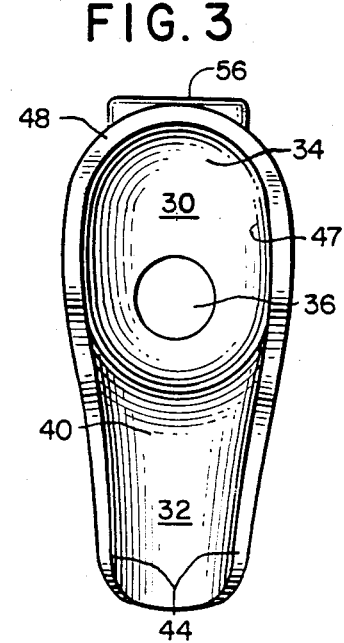
FIG. 3 is a rear elevational view of the sliding foregrip of FIG. 1.

Turning now to FIGS. 2–3, the sliding foregrip 10 includes an elongate foregrip hood portion 30 and an elongate foregrip reel stem portion 32 disposed at the rear of the hood 30 and which extends downwardly therefrom at a preselected angle. A cavity 34 axially extends through the hood 30 between a first opening 36 through which the rod blank 17 passes at the hood front 38 and a second opening 37 at the hood rear end 42. The rod blank opening 36 permits the foregrip 10 to slide axially along the fishing rod blank 17 between a fishing reel installation and/or removal position (FIG. 4) and a fishing reel engagement position (FIG. 5) such that the hood 30 encloses a portion of the reel nut assembly 20, the reel seat 18 and the fishing reel 15.

In an important aspect of the present invention, the hood 30 and its associated cavity 34 are of a predetermined length such that the hood 30 completely covers the reel seat nut assembly 18 and a portion of the reel seat 17. The foregrip 10 further abuts the fishing reel front foot 27 and reel stem 29 when the foregrip is moved to the reel engagement position. The foregrip stem portion 32 includes a channel member 40, having a pair of generally parallel flanges 44 which are joined to a channel web 45 such that the stem portion 32 engages the reel foot 27 and reel stem 29. The overall diameter $D_1$ of the hood cavity 34 is slightly less then the overall diameter $D_2$ of the reel nut assembly 18. Therefore, when the foregrip 10 is slid into a reel engagement position, the hood 30 frictionally engages the reel nut assembly 18, and the foregrip 10 deforms slightly outwardly to accommodate the difference in diameters. The hood cavity inner wall 47 thereby serves as a reel nut engagement surface and effectively prevents rotation of the reel nut assembly and any loosening of the fishing reel 15. Moreover, the hood 30 protects the reel seat nut assembly 20 from the elements and corrosion.

The rear portion 42 of the hood 30 may include a flange 48 which circumferentially extends around the rear of the foregrip between the two stem portion channel flanges 44. The flange 48 is preferably oriented at an angle complementary to the angled slope 50 of the fishing rod handle 16 such that it serves as a stop for the foregrip and also serves as a transition piece which continues the rod handle slope 50 down to the foregrip hood 30. When the foregrip 10 is slid over the reel nut assembly 20 and pushed into the fishing reel engagement position (FIG. 5), the hood rear portion 42 engages the rod handle slope 50 and this engagement resists rotation of the foregrip 10 during use. The engagement of the stem portion channel member 40 and its associated channel flanges 44 with the fishing reel stem 29 also resists rotation of the foregrip 10 during use.

The foregrip hood 30 also includes an enlarged portion 56 which is located forward of the hood flange 48 and generally above the reel nut assembly 18. This enlarged portion 56 terminates in an inclined planar sur ace 58 which rises upwardly from the hood flange 48 to an extent sufficient to accommodate the thumb of the fisherman (FIG. 1) so as to provide a thumb engagement surface or push point for the fisherman during casting. The planar surface 58 is disposed centrally o the foregrip hood 30 between opposing sides of the foregrip 10. As such, when the rear portion 42 of the hood 30 engages the rod handle 16, the planar surface 58 is always located or indexed into its thumb engagement position. (FIG. 5) Preferably, the foregrip 10 is constructed from a resilient material so that it provides a comfortable surface for the fisherman's hand to engage.

A groove 52 is circumferentially disposed at the front foregrip 39 around the rod blank opening 36 and defines a rod engagement lip 54. Due to the resilient nature of the material used for the foregrip, the groove 52 will permit the rod blank opening to expand slightly because the groove 52 allows the rod blank engagement lip 54 to bend radially inwardly of the opening 36, so that one size opening 36 will accommodate rod blanks which are slightly oversized. Thus, exact sizing of the rod opening 36 is not required. Moreover, the use of an oversize rod blank 17 through the opening 36 will increase the frictional grip the foregrip hood has in the rod blank 17.

It will be appreciated that the embodiment of the present invention which has been discussed is merely illustrative of on of the applications of the principles of the invention. Numerous modifications may be made by those skilled in the art without departing from the true spirit and scope of the invention.

What we claim is:

1. A sliding foregrip for use on a fishing rod having a fishing rod blank extending from a fishing rod handle, a fishing reel seat and a reel nut assembly which engages a fishing reel for mounting the fishing reel on the fishing rod, the foregrip being slidable on the fishing rod between a reel removal or installation position and a reel engagement position, the foregrip comprising an elongate hollow hood portion adapted to receive the fishing rod blank axially therein and further adapted to engage the reel nut so as to prevent the rotation thereof, said foregrip further including a stem portion angularly disposed on said hood portion and extending outwardly therefrom, the stem portion having means for engaging the fishing reel and preventing rotation of said foregrip around said fishing rod blank.

2. The sliding foregrip of claim 1, wherein said hood portion includes a planar portion disposed generally forward of said stem portion on the outer surface of said hood portion, the planar portion providing a thumb engagement surface.

3. The sliding foregrip of claim 1, wherein said hood portion is a formed from a resilient, flexible material and includes an opening extending axially therethrough, the overall diameter of the hood portion opening being generally less than the overall diameter of said reel nut such that said hood portion frictionally engages said reel nut when said foregrip is in said reel engagement position.

4. The sliding foregrip of claim 1, wherein said stem portion reel engagement means includes a channel member having a pair of flanges which engage said fishing reel.

5. The sliding foregrip of claim 1, wherein said foregrip hood portion includes a circumferential groove disposed in the hood portion outer surface, said groove being disposed proximate to the forward end of said foregrip, said groove defining an expandable rod blank engagement lip which frictionally engages the fishing rod blank.

6. The sliding foregrip of claim 2, wherein said hood planar portion includes a inclined plane.

7. An improved fishing rod, comprising an elongate rod blank extending outwardly from a rod handle portion, the rod handle portion including fishing reel mounting means having a fishing reel seat and a fishing reel engaging reel nut for engaging said fishing reel on said reel seat and a sliding foregrip which is slidable on said fishing rod between a first reel removal or installation position and a second reel engagement position, the foregrip having a hollow hood portion which includes a elongate cavity generally centrally disposed therein, the hood portion cavity being adapted to receive the fishing rod blank and the reel nut and snugly engage said reel nut, said foregrip further including a stem portion angularly extending outwardly from said hood portion, the stem portion being adapted to engage the fishing reel when said foregrip is slid to said second reel engagement position.

8. The improved fishing rod of claim 7, wherein said sliding foregrip hood portion includes a resilient sheath and the overall diameter of the hood portion cavity approximates that of or the overall diameter of the rod handle reel nut or is less than the overall diameter of the rod handle reel nut such that said hood portion sheath resiliently and frictionally engages said reel nut when said foregrip is in said second reel engagement position.

9. The improved fishing rod of claim 7, wherein said foregrip stem portion includes a channel portion having two generally parallel flanges extending therefrom, said flanges being disposed to engage said fishing reel when said foregrip is in said second reel engagement position.

10. The improved fishing rod of claim 7, wherein said hood portion includes an elongate generally planar portion having a thumb engagement surface thereon.

11. The improved fishing rod of claim 7, wherein said foregrip hood portion cavity includes a fishing reel opening for gripping said fishing rod blank and said foregrip hood portion includes a groove in its outer surface, said groove being disposed proximate to the fishing reel opening, said groove allowing expansion of said opening around said fishing rod blank.

12. The improved fishing rod of claim 7, wherein said foregrip hood includes a circumferential flange portion which engages a surface of said rod handle portion.

* * * * *